(12) United States Patent
Komatsu et al.

(10) Patent No.: US 6,280,300 B1
(45) Date of Patent: Aug. 28, 2001

(54) FILTER APPARATUS

(75) Inventors: Mitsunori Komatsu; Kiyotaka Kawashima; Mutsumi Tanikawa, all of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/450,269

(22) Filed: Nov. 26, 1999

(30) Foreign Application Priority Data

Nov. 25, 1998 (JP) ................................................. 10-334796

(51) Int. Cl.⁷ ...................................................... B24C 9/00
(52) U.S. Cl. ................................................. 451/87; 451/88
(58) Field of Search .................................. 451/87, 88, 91, 451/99, 100, 101; 210/805, 168, 171, 87, 96.1, 101, 143, 195.1, 252, 257.1, 418

(56) References Cited

U.S. PATENT DOCUMENTS

| | | | |
|---|---|---|---|
| 5,772,900 | * | 6/1998 | Yorita et al. ............................ 451/88 |
| 6,048,256 | * | 4/2000 | Obeng et al. ........................... 451/60 |
| 6,051,139 | * | 4/2000 | Lin et al. ................................. 451/60 |
| 6,077,437 | * | 6/2000 | Hayashi et al. ......................... 451/88 |
| 6,106,728 | * | 8/2000 | Iida et al. ................................ 451/60 |
| 6,165,048 | * | 12/2000 | Russ et al. .............................. 451/60 |

FOREIGN PATENT DOCUMENTS

| | | |
|---|---|---|
| 7-52045 | 2/1995 | (JP) . |
| 7-122527 | 5/1995 | (JP) . |
| 9-316216 | 12/1997 | (JP) . |
| 9-316217 | 12/1997 | (JP) . |
| 11-151409 | 6/1999 | (JP) . |

* cited by examiner

Primary Examiner—Derris H. Banks
(74) Attorney, Agent, or Firm—Wenderoth, Lind & Ponack, L.L.P.

(57) ABSTRACT

A filter apparatus provided in a fluid pipeline for conveying a treatment fluid. A regenerating pipeline is provided adjacently to the fluid pipeline to convey a regenerating liquid. At least two filter units are switched between the fluid pipeline and the regenerating pipeline by a switching valve device. The filter apparatus enables a filter replacing operation to be carried out smoothly and reliably and is also capable of reliably trapping solid particles contained in the fluid, e.g. an abrasive liquid, continuously without the need of a filter replacing operation, thereby allowing supply of a fluid of high quality and a stable operation free from clogging.

19 Claims, 17 Drawing Sheets

FILTER APPARATUS

BACKGROUND OF THE INVENTION

The present invention relates to a filter apparatus provided in a pipeline for conveying a fluid to remove solid impurities from the fluid. More particularly, the present invention relates to a filter apparatus suitable for use in a supply line for an abrasive liquid used in a chemical/mechanical polisher (CMP) for semiconductor substrates. The present invention also relates to a method of regenerating a filter unit.

With the rapid progress of the technology to fabricate high-integration semiconductor devices in recent years, circuit wiring patterns or interconnections have been becoming increasingly small and fine, and spaces between wiring patterns have also been decreasing. As the wiring spacing decreases, the depth of focus becomes shallower in circuit pattern formation by photolithography or the like. Accordingly, surfaces of semiconductor wafers on which circuit pattern images are to be formed by a stepper require a higher degree of surface flatness.

FIG. 15 shows a conventional polishing apparatus for making the surface of a semiconductor wafer flat. The apparatus has a polishing table 4 with a polishing cloth 2, for example, bonded to the surface thereof to form a polishing surface. The apparatus further has a substrate holder 6 for holding a substrate W to be polished, e.g. a semiconductor wafer. With an abrasive liquid Q being supplied between the polishing surface and a surface of the substrate W that is to be polished from an abrasive liquid supply pipe 8, the substrate W is pressed against the polishing surface with a predetermined pressure by the top ring 6, and while doing so, the polishing surface and the substrate W are caused to slide relative to each other to perform polishing. Such a polishing apparatus performs mechanical polishing using an abrasive liquid as a polishing fluid, and in some cases, it also performs polishing accompanied by a chemical action using an alkaline or acidic polishing solution.

In an abrasive liquid supply system of such a polishing apparatus, abrasive grains may agglomerate to form particles in the pipeline. If supplied to the surface to be polished, such particles cause flaws, known as scratches, on the surface to be polished. Accordingly, it is conceivable to equip the pipeline with a filter apparatus for trapping particles larger than a predetermined size in the supplied fluid. In such a filter apparatus, as shown in FIG. 16, filter units fa and fb are connected to branched pipelines, which are branched off from the abrasive liquid supply pipeline, through respective joints (not shown), so that when a predetermined processing time has elapsed, the used filter unit fa or fb can be replaced without stopping the abrasive liquid supply line.

However, in a case where filter units are connected to the pipeline through joints as stated above, it is necessary to conduct an operation of detaching and reattaching bolts and nuts when the filter units are replaced. The efficiency of the operation is unfavorably low because the abrasive liquid scatters. Moreover, abrasive grains in the abrasive liquid remaining in the branched pipeline that is not used may agglomerate to form particles.

SUMMARY OF THE INVENTION

In view of the above-described circumstances, an object of the present invention is to provide a filter apparatus that enables a filter replacing operation to be carried out smoothly and reliably and that is also capable of reliably trapping solid particles contained in a fluid, e.g. an abrasive liquid, in a pipeline continuously without the need of a filter replacing operation, thereby allowing supply of a fluid of high quality and a stable operation free from clogging.

Another object of the present invention is to provide a regenerating method capable of efficiently removing abrasive grains deposited in a filter unit by passing a liquid through the filter unit and allowing a completely automated operation by repeating a filtering operation and a regenerating operation continuously without carrying out a filter replacing operation.

The present invention provides a filter apparatus provided in a fluid pipeline for conveying a treatment fluid. The filter apparatus includes a regenerating pipeline provided adjacently to the fluid pipeline to convey a regenerating liquid, and at least two filter units. The filter apparatus further includes a switching valve device for switching the filter units between the fluid pipeline and the regenerating pipeline.

Thus, the filter unit having trapped abrasive grains is moved to the position of the regenerating pipeline and subjected to a regenerating treatment at this position. Accordingly, a continuous filtering treatment can be performed without detaching the filter unit for replacement. Regarding the regenerating treatment, the number of filter units to be switched should be set by taking into consideration the period of time required for regeneration. The used filter unit may be replaced with a filter unit in a purified state, which has been cleaned in the regenerating pipeline.

The switching valve device may be one in which the filter units are mounted on a valving element so as to move together with the valving element as one unit. Such a structure allows the flow path arrangement of the switching valve device to be simplified to a considerable extent.

In the above-described filter apparatus, the treatment fluid may be an abrasive liquid, and the regenerating liquid may be a chemical liquid containing a component that redissolves deposited abrasive grains. In this case, the filter apparatus further includes an adjusting mechanism for adjusting at least one of the temperature and concentration of the regenerating liquid to a predetermined level. With this arrangement, the solidified abrasive grains are redissolved so as to be readily washed away. Accordingly, it is possible to speed the regeneration of the used filter unit. The predetermined temperature is preferably not lower than 40° C., more preferably not lower than 50° C. The device for controlling the temperature of the regenerating liquid may be provided in a regenerating liquid source. Alternatively, the device may be provided in the filter apparatus itself or in a pipeline between the regenerating liquid source and the filter apparatus.

The abrasive grains may be silica grains, and the regenerating liquid may be a liquid containing KOH. It was found that a liquid containing KOH has a superior ability to redissolve colloidal silica. It should be noted that the pH of the regenerating liquid is preferably not lower than 11.0.

In addition, the present invention provides a polishing apparatus including a polishing table and a holding device for pressing the surface of a substrate to be polished against the surface of the polishing table. The polishing apparatus further includes a driving device for causing the surface of the polishing table and the surface of the substrate to be polished to slide relative to each other, and an abrasive liquid supply system for supplying an abrasive liquid between the surface of the polishing table and the surface of the substrate to be polished. The above-described filter apparatus is provided in an abrasive liquid supply pipeline of the abrasive liquid supply system.

In addition, the present invention provides a method of regenerating a used filter unit which has been provided in a fluid pipeline for conveying a polishing solution containing abrasive grains and in which abrasive grains have been deposited. According to the regenerating method, a regenerating liquid containing a component that redissolves the abrasive grains deposited in the filter unit is adjusted to a predetermined temperature and/or a predetermined concentration, and the filter unit is soaked with the regenerating liquid. Thus, the solidified abrasive grains are redissolved so as to be readily washed away, and it is possible to speed the regeneration of the filter unit.

The above and other objects, features and advantages of the present invention will become more apparent from the following description of the preferred embodiments thereof, taken in conjunction with the accompanying drawings.

DETAILED DESCRIPTION OF THE INVENTION

The present invention will be described below in detail with reference to the accompanying drawings.

Figure 3:
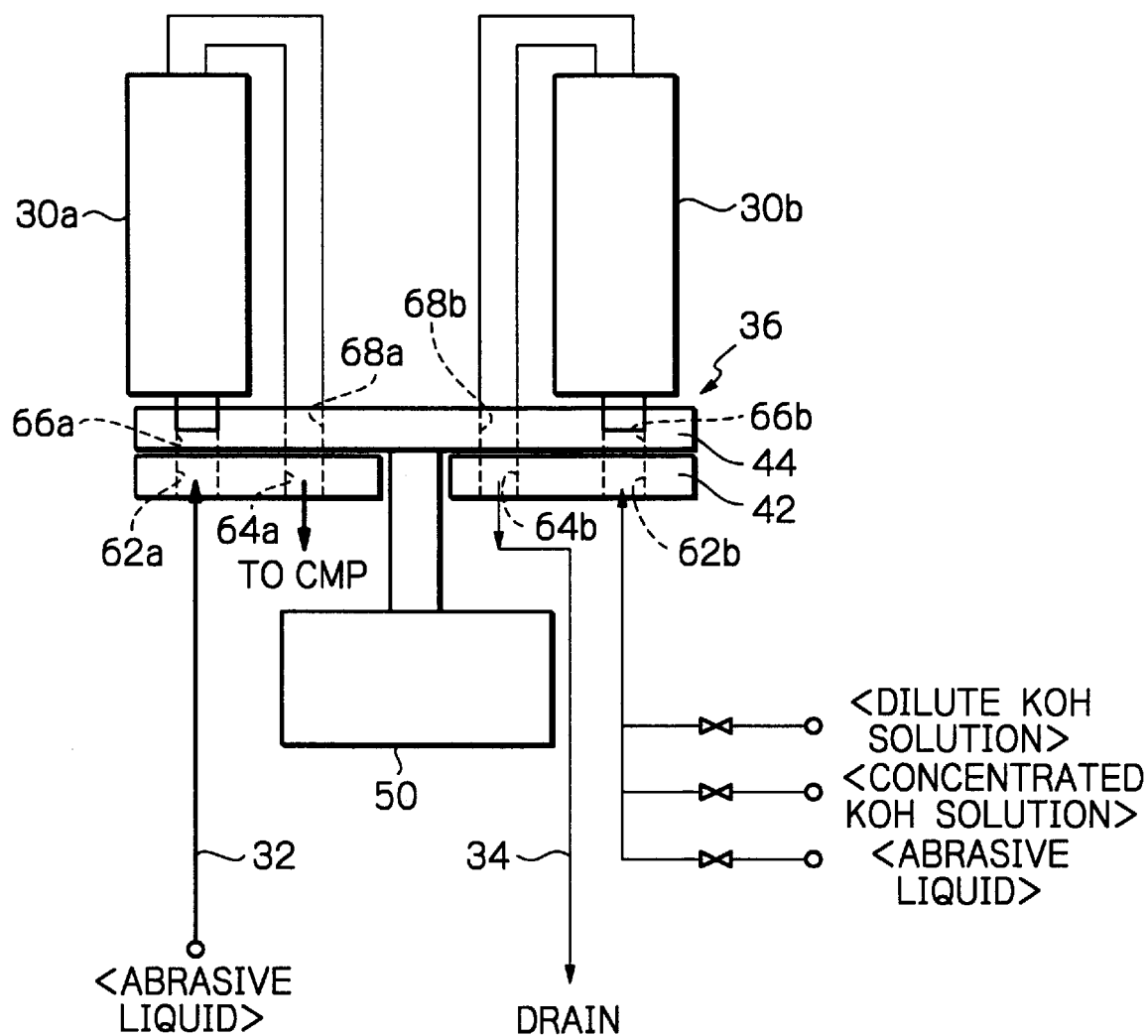
FIG. 3 is a diagram schematically showing the filter apparatus according to the embodiment shown in FIG. 1.
Figure 4:
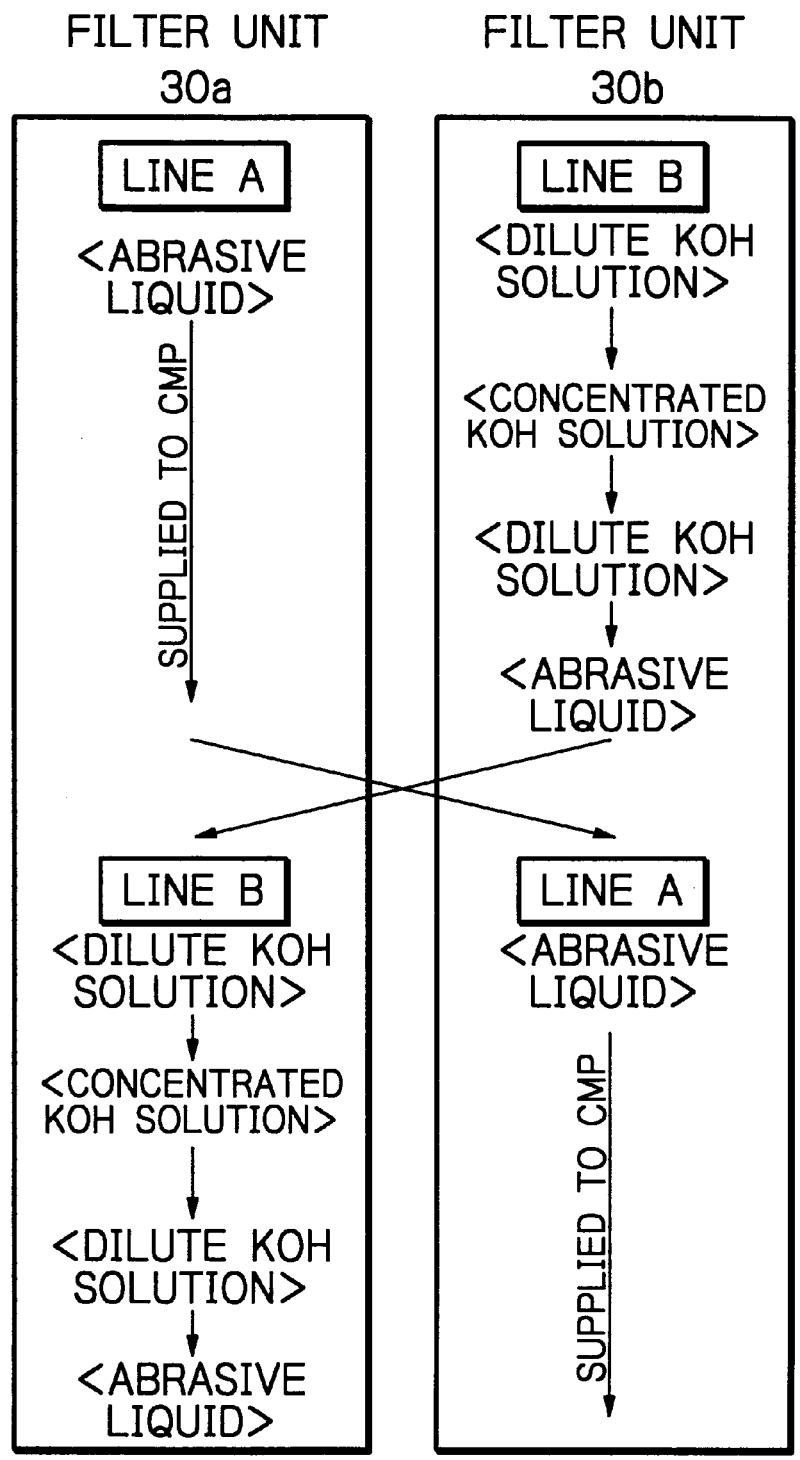
FIG. 4 is a flow diagram showing the operation of the filter apparatus according to the embodiment shown in FIG. 1.
Figure 5:
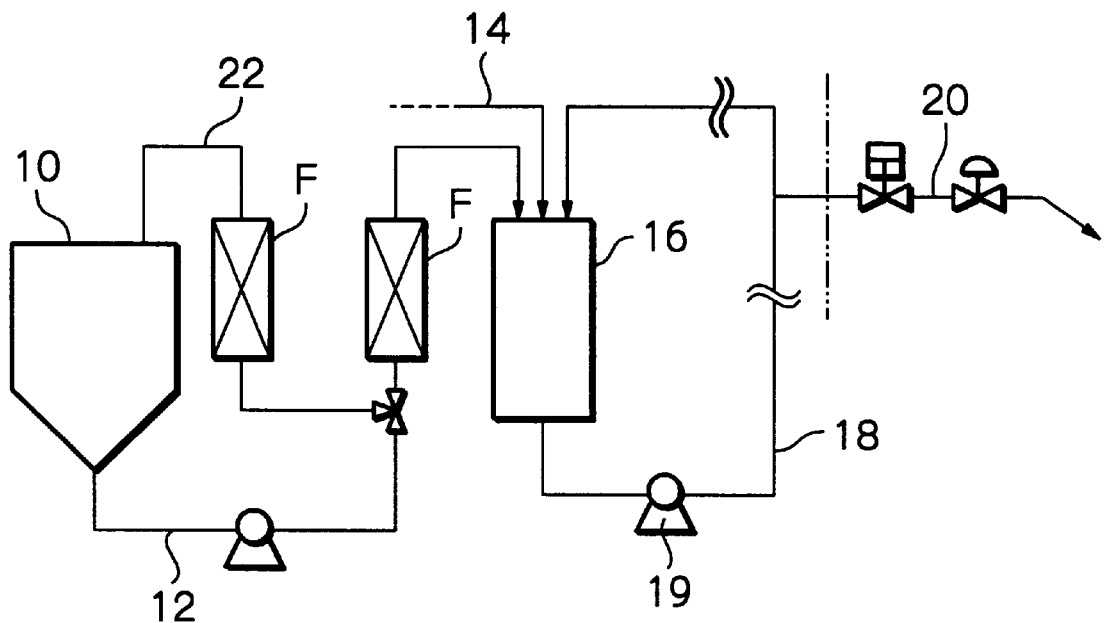
FIG. 5 is a diagram showing an example of an abrasive liquid supply system in which the filter apparatus according to the embodiment of the present invention may be used.
Figure 6:
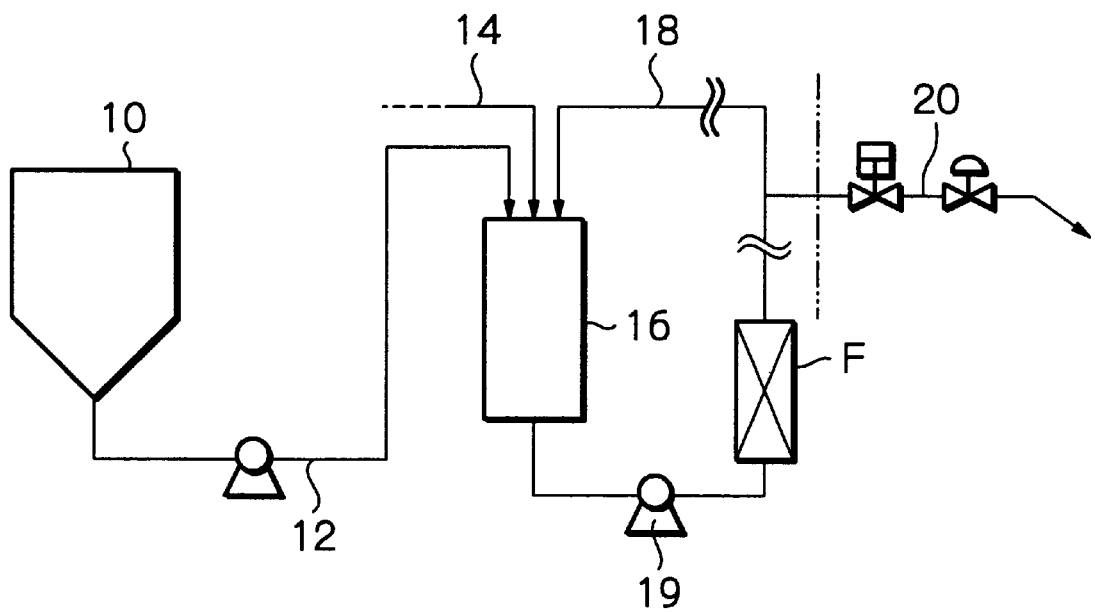
FIG. 6 is a diagram showing another example of an abrasive liquid supply system in which the filter apparatus according to the embodiment of the present invention may be used.
Figure 7:
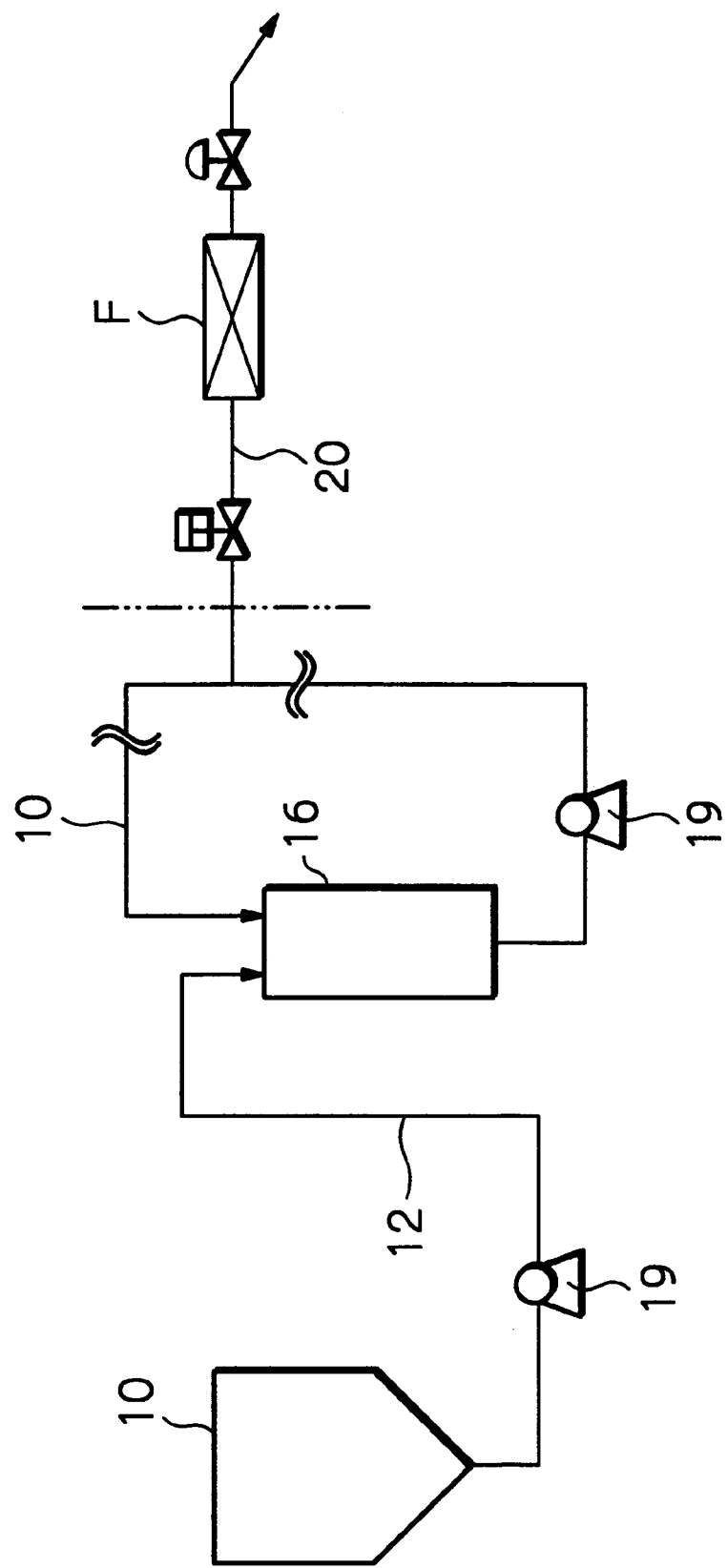
FIG. 7 is a diagram showing still another example of an abrasive liquid supply system in which the filter apparatus according to the embodiment of the present invention may be used.

FIGS. 1 to 4 show a filter apparatus F according an embodiment of the present invention. The filter apparatus F is installed at a predetermined position in a pipeline of an abrasive liquid supply system arranged as shown in FIGS. 5 to 7. The abrasive liquid supply system has a mixing tank 16 for storing an abrasive liquid of predetermined concentration prepared by mixing together a raw liquid supplied thereto from an abrasive raw liquid tank 10 through a raw liquid supply line 12 and a diluent supplied thereto from a diluent tank (not shown) through a diluent supply line 14. A circulating path 18 forms a circulating flow path including the mixing tank 16. A pump 19 circulates the abrasive liquid through the circulating path 18. The abrasive liquid supply system further has a draw pipeline 20 for supplying the abrasive liquid from the circulating path 18 to a polishing apparatus.

As the raw liquid for the abrasive liquid, an acidic, alkaline or neutral liquid containing grains with a predetermined grain size, for example, grains of silica, alumina, cerium oxide or manganese dioxide, is used according to each particular object to be polished. As the diluent, pure water or an acidic, alkaline or neutral chemical liquid free from impurities is generally used. The raw liquid supply line 12 and the diluent supply line 14 are provided with necessary on-off valves, pressure gauges, back pressure valves, flowmeters, constant flow regulating valves, orifices, etc. The raw liquid supply line 12 and the diluent supply line 14 may be provided with a cleaning pipeline or an abrasive liquid sampling pipeline. The circulating path 18 for the abrasive liquid is arranged to cause the abrasive liquid to flow even when the supply of the abrasive liquid is stopped, thereby preventing agglomeration of abrasive grains. In the embodiment shown in FIG. 5, such a circulating path 22 is also provided for the raw liquid supply line 12. FIG. 5 shows an example in which filter apparatuses F are provided in the raw liquid supply line 12 and the circulating path 22 of the raw liquid supply line 12, respectively. FIG. 6 shows an example in which a filter apparatus F is provided in the circulating path 18. FIG. 7 shows an example in which a filter apparatus F is provided in the draw pipeline 20. However, these filter apparatuses F may be used jointly.

Figure 1:
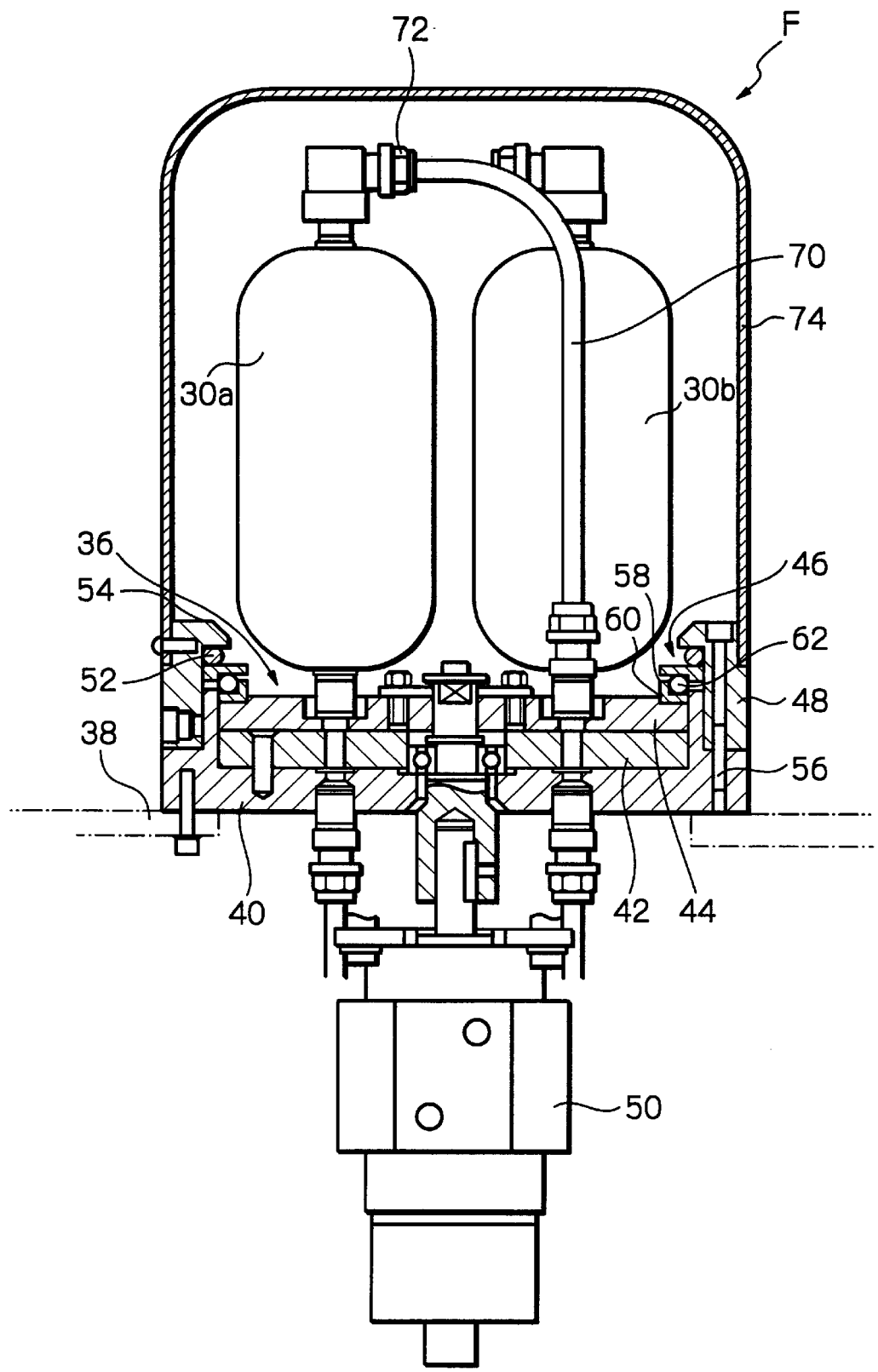
FIG. 1 is a sectional view showing one embodiment of the filter apparatus according to the present invention.
Figure 2:
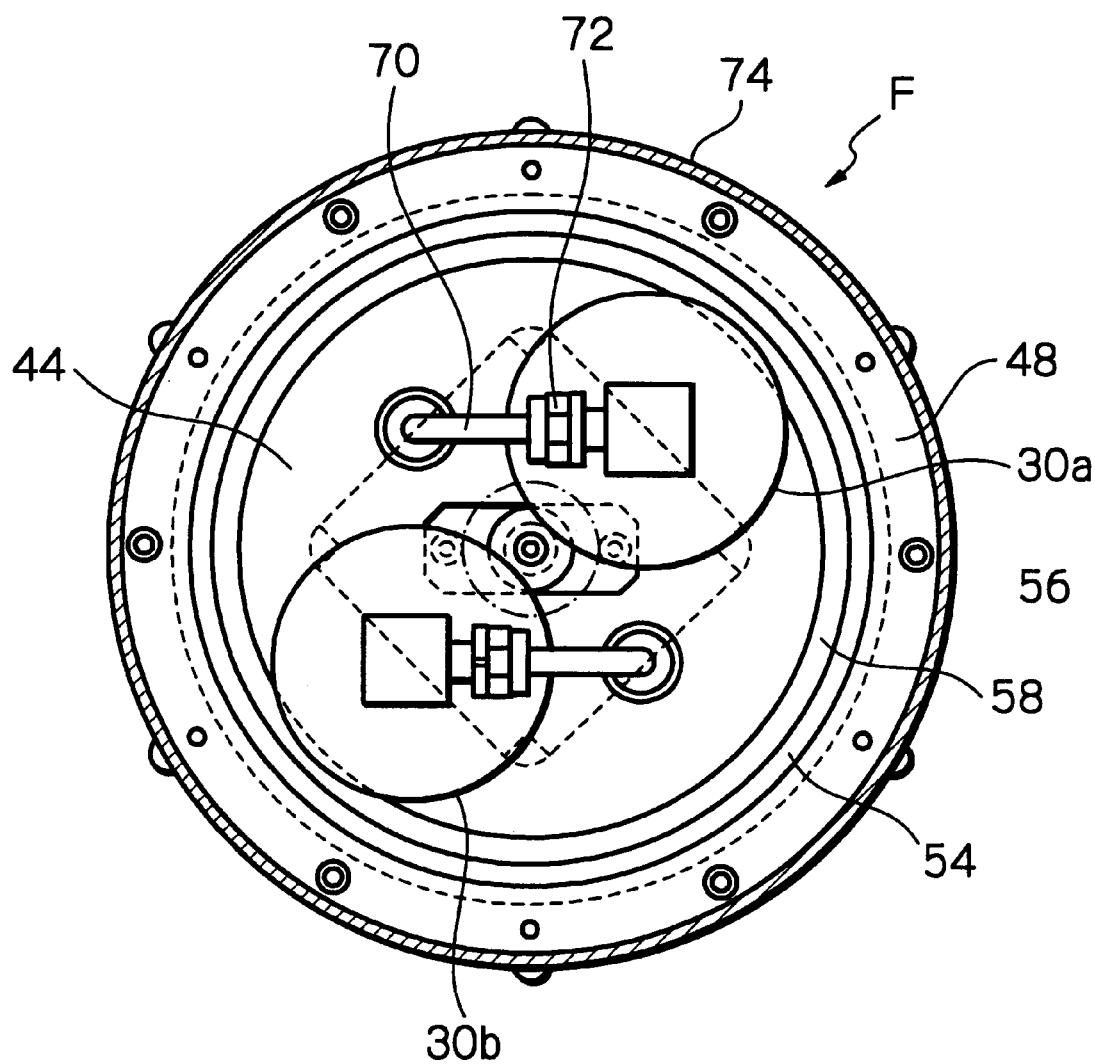
FIG. 2 is a sectional plan view of the embodiment shown in FIG. 1.

The filter apparatus F has a two-path/two-position switching device 36 for switching two filter units 30a and 30b between an abrasive liquid line 32 and a regenerating line 34 (see FIG. 3). As shown in FIGS. 1 and 2, the filter apparatus F is mounted on a mounting plate 38 with an opening so as to extend through the opening. The filter apparatus F has a first casing 40 that has a bottom plate and a cylindrical wall standing on the bottom plate. A disk-shaped fixed plate 42 and a disk-shaped movable plate 44 are accommodated in the first casing 40. A second casing 48 presses the movable plate 44 against the fixed plate 42 through a guide mechanism 46. A rotary actuator 50 drives the movable plate 44 to rotate or reverse through 180 degrees by supplying air.

Each of the filter units 30a and 30b is formed, for example, by filling a folded filtration membrane in a casing made of a resin material. An auxiliary member made of a resin material may be added to the filtration membrane to impart the required strength thereto. It is not always necessary to fold the filtration membrane.

The fixed plate 42 and the movable plate 44 are formed from a ceramic material consisting essentially of SiC, for example. The fixed plate 42 and the movable plate 44 have respective sliding surfaces finished flat. The sliding surfaces are brought into close contact with each other by pressing both the fixed plate 42 and the movable plate 44 with a predetermined pressure. Thus, leakage of a fluid can be prevented. The rotary actuator 50 is mounted on the lower side of the first casing 40 so as to project through the opening of the mounting plate 38. The output shaft 51 of the rotary actuator 50 extends through respective shaft holes of the first casing 40 and the fixed plate 42 and is connected to the movable plate 44. The fixed plate 42 and the movable plate 44 may also be made of a resin material producing minimal friction, e.g. a fluorocarbon resin, besides SiC.

The second casing 48 is formed in the shape of a cylinder that surrounds the cylindrical wall of the first casing 40. A holding portion 54 is formed on the inside of the upper part of the second casing 48 to hold the guide mechanism 46 through a seal ring (elastic ring) 52. The second casing 48 is secured to the first casing 40 with bolts 56. The guide mechanism 46 has an annular first guide member 58 with an L-shaped sectional configuration that is mounted on the outer edge on the upper side of the movable plate 44. An annular second guide member 60 with an L-shaped sectional configuration is provided on the inner side of the second casing 48 so as to face opposite to the first guide member 58. A plurality of steel balls (bearing balls) 62 are disposed between the guide members 58 and 60.

The seal ring 52 prevents leakage of a liquid from the area of contact between the sliding surfaces of the fixed plate 42 and the movable plate 44 by applying a predetermined surface pressure between the fixed plate 42 and the movable plate 44 when the second casing 48 is secured to the first casing 40 with the bolts 56. Thus, the guide mechanism 46 that rotatably retains the movable plate 44 while maintaining the required surface pressure between the fixed plate 42 and the movable plate 44 is constructed.

As shown in FIGS. 1–3, the first casing 40 is formed with two sets of incoming and outgoing flow paths at respective positions which are in symmetry with respect to the center of the first casing 40. The two sets of incoming and outgoing flow paths are selectively brought into communication with the two filter units 30a and 30b, respectively. The fixed plate 42 is also formed with flow paths 62a, 62b, 64a and 64b at the same positions as the flow paths in the first casing 40. The movable plate 44 is also formed with two sets of flow paths 66a, 66b, 68a and 68b at positions respectively corresponding to the flow paths in the fixed plate 42. Thus, a switching valve device 36 that switches two flow paths between two positions is constructed. The filter units 30a and 30b are each formed by filling a filtering material in a cylindrical casing with ports at the upper and lower ends thereof. The filter units 30a and 30b are detachably connected to incoming and outgoing paths in the upper side of the movable plate 44 through pipelines 70 and joints 72. In this embodiment, the filter units 30a and 30b are mounted directly on the movable plate 44. Therefore, the arrangement of the switching valve 36 is simplified to a considerable extent. A cover 74 covering the upper side of the filter apparatus F is secured to the outer periphery of the top of the second casing 48.

The regenerating line 34 cleans the used filter unit 30a or 30b to regenerate it. As shown in FIG. 3, the incoming path of the regenerating line 34 is selectively connected with a pH-adjusting dilute KOH solution source whose pH is of the order of 10.0, a concentrated KOH solution source whose pH is not lower than 11.0, and an abrasive liquid source. The outgoing path of the regenerating line 34 is connected to a vent pipeline leading to a drain. Although not shown in the figure, each KOH solution source is provided with a temperature controller capable of controlling the liquid temperature to a predetermined level according to the temperature value detected with a temperature sensor and also provided with a concentration controller that controls the concentration of the KOH solution to a predetermined value according to the concentration value detected with a pH sensor.

The operation of the filter apparatus F arranged as stated above will be described below by way of an example in which alkaline SC-1 (Trade Name), in which colloidal silica is freely dispersed in KOH is used as an abrasive liquid, with reference to the process drawing of FIG. 4. In a normal operation, one of the filter units 30a and 30b ( 30a in FIG. 3) is connected to the abrasive liquid line 32 to filter out solid matter in the abrasive liquid, and the other filter unit ( 30b in FIG. 3) is connected to the regenerating line 34 to carry out a cleaning and regenerating process.

At a predetermined timing when the amount of solid matter trapped in the filter unit connected to the abrasive liquid line 32 reaches a predetermined value, the used filter unit is switched to the regenerating line 34, and at the same time, the cleaned and regenerated filter unit, which has been connected to the regenerating line 34, is switched to the abrasive liquid line 32. The switching timing may be determined, for example, by directly or indirectly measuring an amount of solid matter trapped in the filter units, or by measuring that a predetermined time has passed which is predicted by previously measuring a processing time which is required for the filter unit to reach its trapping capacity. Examples of the trapped material amount measuring method include a method wherein a difference between the pressure on the upstream side of the filter unit and the pressure on the downstream side of the filter unit is measured, a method wherein the weight of the filter unit is measured, and a method wherein the number of agglomerated particles in the slurry passed through the filter unit is measured. The filter units 30a and 30b are switched by rotating the movable plate 44 through 180 degrees by the operation of the rotary actuator 50. The filter unit that has been subjected to the cleaning and regenerating process to recover its high trapping capacity is placed at the position of the abrasive liquid line 32, and thus the supply of the abrasive liquid is continuously performed. Switching between the filter units is automatically carried out in response to a signal from an external controller.

In the regenerating line 34, a regenerating liquid is supplied to the filter unit in the same direction as the direction of supply of the abrasive liquid in the abrasive liquid line 32 to carry out the cleaning and regenerating process. In this process, first, the dilute KOH solution is supplied to the filter unit under predetermined conditions, for example, at a pressure of 100 kPa (1 kgf/cm$^2$) and a flow rate of 10 l/min. for 2 min., thereby washing relatively-easy-to-remove abrasive grains away from the filter unit. Thereafter, the concentrated KOH solution heated to about 50° C. is supplied, for example, at a pressure of 100 kPa (1 kgf/cm$^2$) and a flow rate of 10 l/min. for 10 min, thereby dissolving abrasive grains adhering to the filter unit and removing them from the filter unit. Further, the dilute KOH solution is supplied, for example, at a pressure of 100 kPa (1 kgf/cm²) and a flow rate of 10 l/min. for 2 min. to adjust the pH of the filter unit. Then, the filter unit stands by in this state. When it is predicted that it will soon become necessary to switch the filter units 30a and 30b from one to the other after a predetermined processing time has elapsed, the filter unit that is on standby is supplied with the abrasive liquid so as to be soaked therewith, thereby preventing the occurrence of sharp changes in pH and concentration of the abrasive liquid when the filter units 30a and 30b are switched over from one to the other.

Repeating the above-described process enables the abrasive liquid to be continuously and automatically supplied without stopping the abrasive liquid line 32 and without carrying out the process of detaching the filter units 30a and 30b from the joints, which is inferior in operating efficiency. It should be noted that when one of the filter units 30a and 30b is to be replaced because the lifetime thereof has completed its span, the filter unit 30a or 30b is switched to the regenerating line 34 to subject it to a cleaning and draining process for a short period of time. Thereafter, the cover 74 is removed, and the joints are detached to carry out a replacing operation. Because the filter unit has been subjected to the cleaning and draining process, there is no abrasive liquid to scatter. Accordingly, the replacing operation can be carried out efficiently.

Although in the foregoing embodiment the same chemical liquid (KOH) as that used in the abrasive liquid to disperse abrasive grains is used as a regenerating liquid and this is favorable, it is also possible to use a chemical liquid such as $NH_4OH$ that is harmless to the filter unit and superior in replaceability and that does not change the composition of the abrasive liquid. In addition, although in the foregoing embodiment KOH is preheated, a heater for temperature control may be provided in the regenerating pipeline or the filter apparatus itself. It is also possible to provide members for temperature-controlling of the regenerating pipeline and the filter unit. In addition, the method of the present invention is usable not only in the above-described switching type apparatus but also in an apparatus in which a filter unit is removed from a pipeline when it is to be cleaned and regenerated. Although in the foregoing embodiment the filter regenerating direction is the same as the abrasive liquid supply direction, the filter unit may be cleaned and regenerated in the opposite direction. In such a case also, the filter unit can be favorably regenerated as in the case of the above. In this case, it is preferable to supply the abrasive liquid in the forward direction in the process of replacing the cleaning liquid in the filter unit with the abrasive liquid.

EXAMPLES

A test for the ability of the abrasive liquid to dissolve the solid matter deposited in the filter unit was carried out using alkaline SC-1 (Trade Name) containing colloidal silica and KOH as the abrasive liquid. In Table 1 below, DIW in the first row is pure water with a temperature of 20° C., and the others are aqueous KOH solutions with a temperature in the range of from 20° C. to 50° C. and a pH in the range of from 12.8 to 10.7. In this test, favorable results were obtained when the pH was 11.3 or greater and the temperature was 40° C. or higher.

TABLE 1

Test of Dissolubility for Solid Matter Deposited in Filter

| KOH temperature | pH | Dissolubility | Observations |
|---|---|---|---|
| (DIW) 20 | | x | Dissolution not observed |
| 20 | 12.8 | x | Dissolution not observed |
| 40 | 12.8 | ○ | Partially left undissolved |
| 50 | 12.8 | ⊙ | Completely removed |
| 50 | 11.3 | ○ | Partially left undissolved |
| 50 | 10.7 | Δ | Slightly dissolved |

Figure 8:
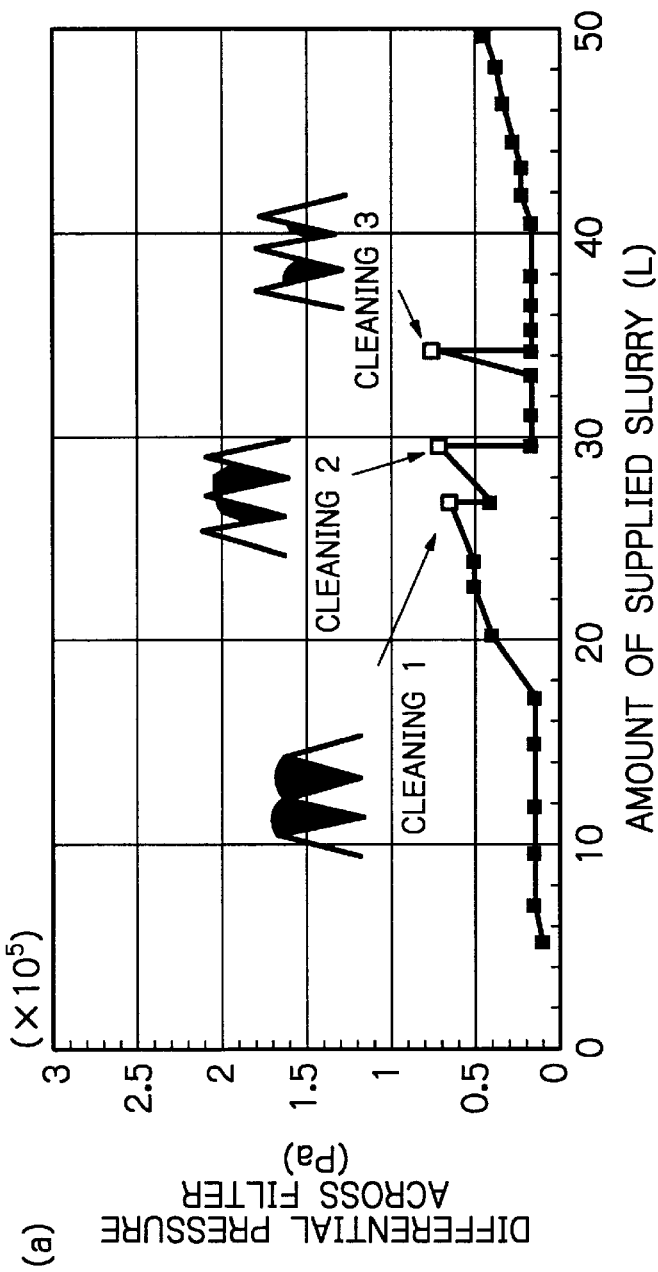
FIG. 8 is a graph showing the results of a test, which shows the effects of the method according to the present invention.

Part (a) of FIG. 8 shows an experimental example in the case of using a pleated filter as a filter unit. While the slurry (abrasive liquid) was supplied at a constant flow rate, the differential pressure was measured, and when a predetermined differential pressure was reached, cleaning was carried out by using an aqueous KOH solution as a regenerating liquid. In part (a) of FIG. 8, figures denoted by cleaning 1 to 3 each show the pleated structure of the filter and the degree of amount of solid matter remaining in the pleats of the filter unit immediately after each cleaning process. The temperature and pH of each regenerating liquid and the method of cleaning are shown in part (b) of FIG. 8. As will be clear from FIG. 8, cleaning 1 produces almost no effect. In the case of cleaning 2, a significant effect is produced, but it does not last long. In the case of cleaning 3, a significant effect is produced, and it lasts long. Thus, it is noted that the temperature and pH of the regenerating liquid are important factors of the filter cleaning.

Figure 9:
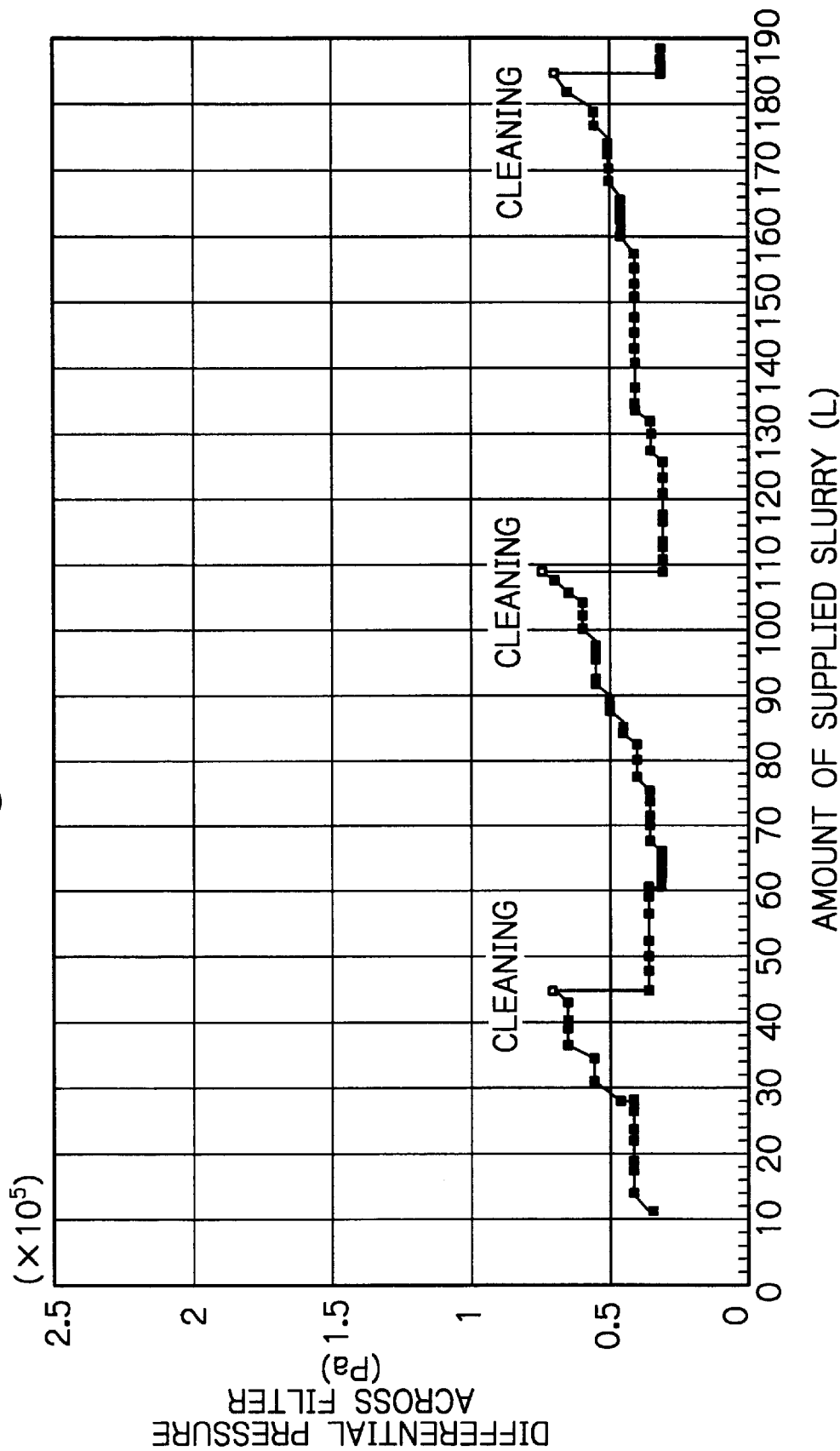
FIG. 9 is a graph showing the results of a test, which shows the effects of the method according to the present invention.

FIG. 9 is a graph showing the results of a test in which an actual process was carried out by using a membrane type filter as a filter unit installed in the apparatus shown in FIG. 1. As a regenerating liquid, a KOH solution having a pH of 13.5 and heated to a temperature of 50° C. was used. The differential pressure across the filter unit was measured, and when it exceeded 60 kPa (0.6 kgf/cm²), a regenerating treatment was carried out for 2 minutes. Then, filtration of the slurry was continued. As the result of the regenerating treatment, the differential pressure lowered to 30 kPa (0.3 kgf/cm²). Thereafter, it was possible for the regenerated filter to filter a predetermined amount of slurry continuously. Accordingly, it was possible to increase the lifetime of the filter unit to a considerable extent.

Figure 10:
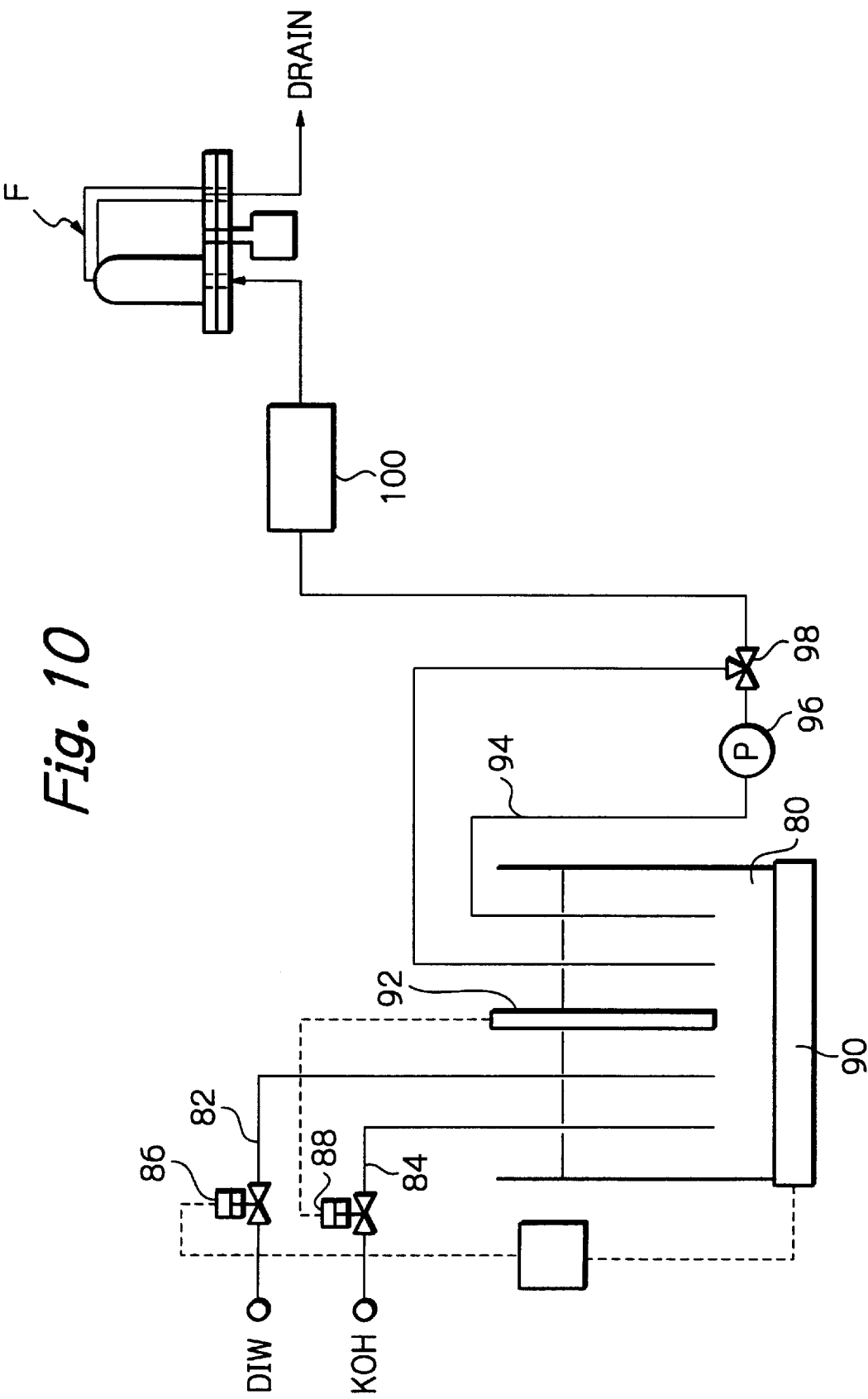
FIG. 10 is a diagram showing an example of the arrangement of a regenerating liquid supply source usable in the filter apparatus according to the present invention.

FIG. 10 shows an embodiment of a regenerating liquid supply apparatus having a regenerating liquid concentration adjusting function and a heat-up function for carrying out the above-described filter unit regenerating method. The regenerating liquid supply apparatus has an adjusting tank 80. The adjusting tank 80 is connected with a pure water supply pipe 82 and a highly concentrated KOH supply pipe 84 through respective on-off valves 86 and 88. A load cell 90 is provided in the bottom of the tank 80, and a pH meter 92 is provided in the tank 80. A discharge pipeline 94 that leads from the adjusting tank 80 to the filter apparatus F is provided with a pump 96, an on-off valve 98 and an in-line heater 100. The in-line heater 100 heats up the passing liquid in a stroke with a halogen lamp, a heating wire, etc.

Thus, operating the on-off valves 86 and 88 according to the indicated values of the load cell 90 and the pH meter 92 allows a predetermined amount of regenerating liquid prepared with a predetermined concentration to be stored in the tank 80 at all times. As a filter apparatus cleaning operation starts, the KOH solution adjusted in the adjusting tank 80 is supplied to the filter apparatus F by the operation of the pump 96 after it has been heated to 50° C., for example, in one pass by the in-line heater 100.

Figure 11:
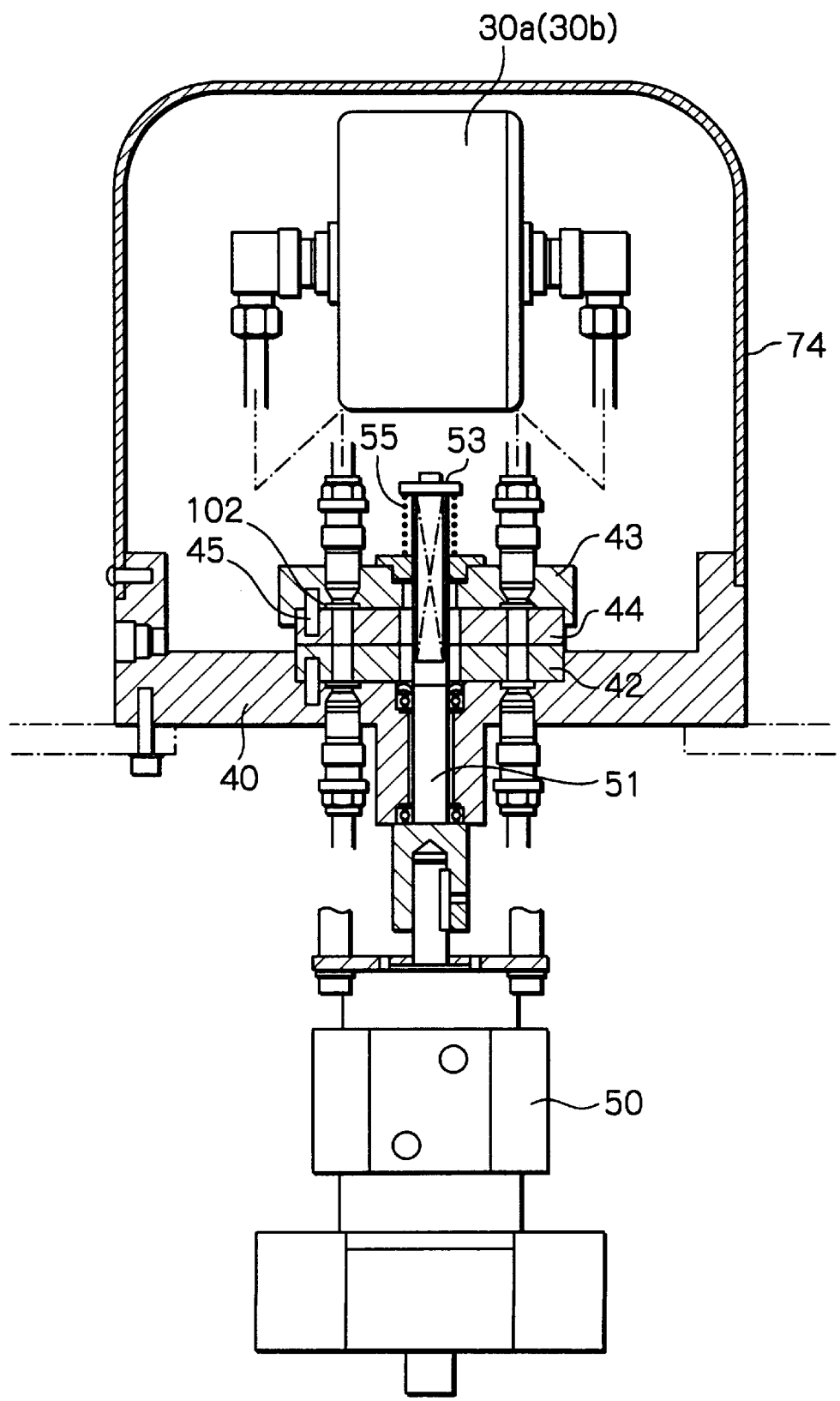
FIG. 11 is a diagram showing a filter apparatus according to another embodiment of the present invention.
Figure 12:
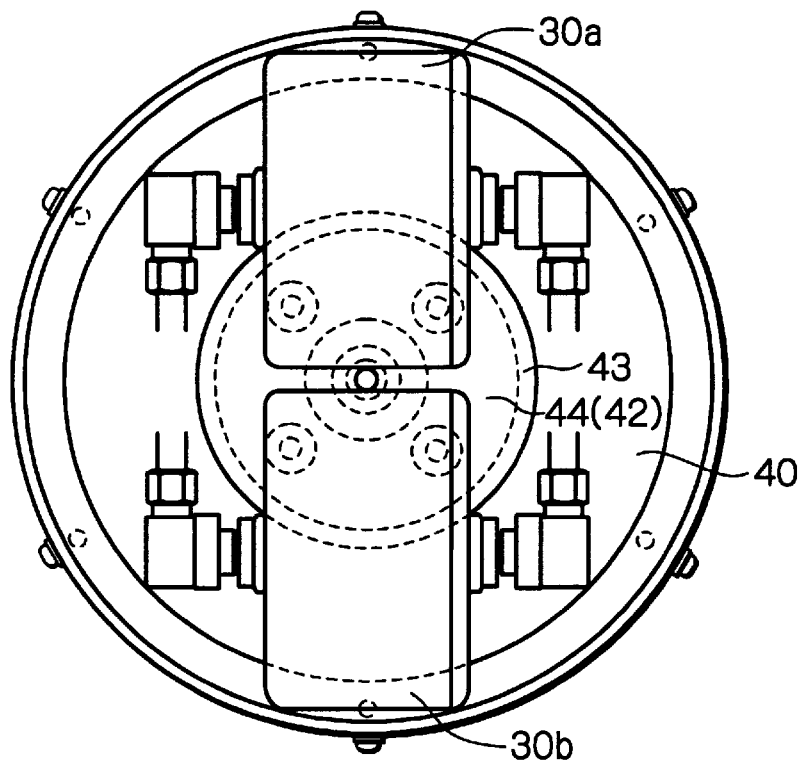
FIG. 12 is a plan view of the filter apparatus shown in FIG. 11.

FIGS. 11 and 12 show a modification of the filter apparatus F. In the modification, the tip end portion of the output shaft 51 of the rotary actuator 50 extends beyond the movable plate 44 and a press plate 43 securely connected to the movable plate 44 by means of fixing pins 45. The movable plate 44 and the press plate 43 are drivingly connected to the output shaft 51 while being slidable along the output shaft 51. In addition, a spring 55 is mounted between the press plate 43 and a spring retainer 53 at the tip end of the output shaft 51 of the rotary actuator 50 to load a predetermined surface pressure between the fixed plate 42 and the movable plate 44, thereby preventing leakage of a liquid from the area between the fixed plate 42 and the movable plate 44. In this modification, the filter units 30a and 30b are mounted in the cover 74 and are fluidly connected to the corresponding incoming and outgoing fluid paths formed in the press plates fluidly communicated with the corresponding incoming and outgoing paths in the movable plate 44 by flexible pipes. The filter units 30a and 30b may be of course secured to the press plate as in the embodiments stated above.

Figure 13:
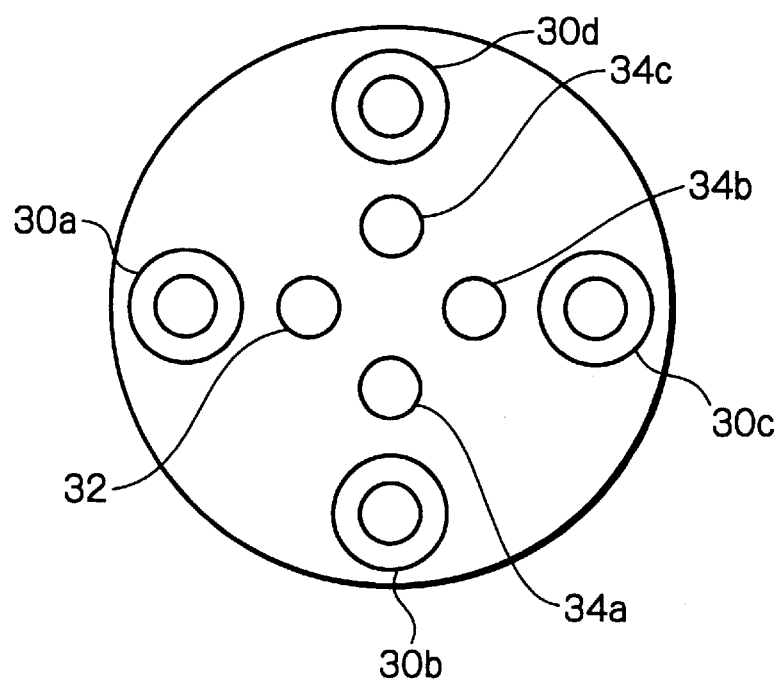
FIG. 13 is a diagram showing a filter apparatus according to still another embodiment of the present invention.

FIG. 13 shows a filter apparatus according to another embodiment of the present invention. In the foregoing embodiment, two filter units are switchably mounted, whereas in this embodiment, four filter units 30a, 30b, 30c and 30d are mounted in axial symmetry with each other. Regarding pipelines connected to the filter units 30a, 30b, 30c and 30d, there is one abrasive liquid line 32 that is connected to a first position, and different regenerating lines 34a, 34b and 34c are connected to the other three positions, respectively. That is, a dilute KOH solution pipeline is connected to a second position, and both a concentrated KOH solution pipeline and a dilute KOH solution pipeline are connected to a third position. In addition, an abrasive liquid supply pipeline for replacement is connected to a fourth position.

In this filter apparatus, the filter units are cleaned and regenerated by sequentially carrying out different processes at the three positions. Thus, a sufficiently long period of time can be taken for cleaning and regeneration. In addition, the liquid supply line for cleaning and regeneration can be simplified. Although in this embodiment the filter apparatus is arranged so that the filter units are switchable among four positions, the arrangement may be such that three positions or five or more positions are equally spaced concentrically so as to allow filter units to switch among these positions.

Figure 14:
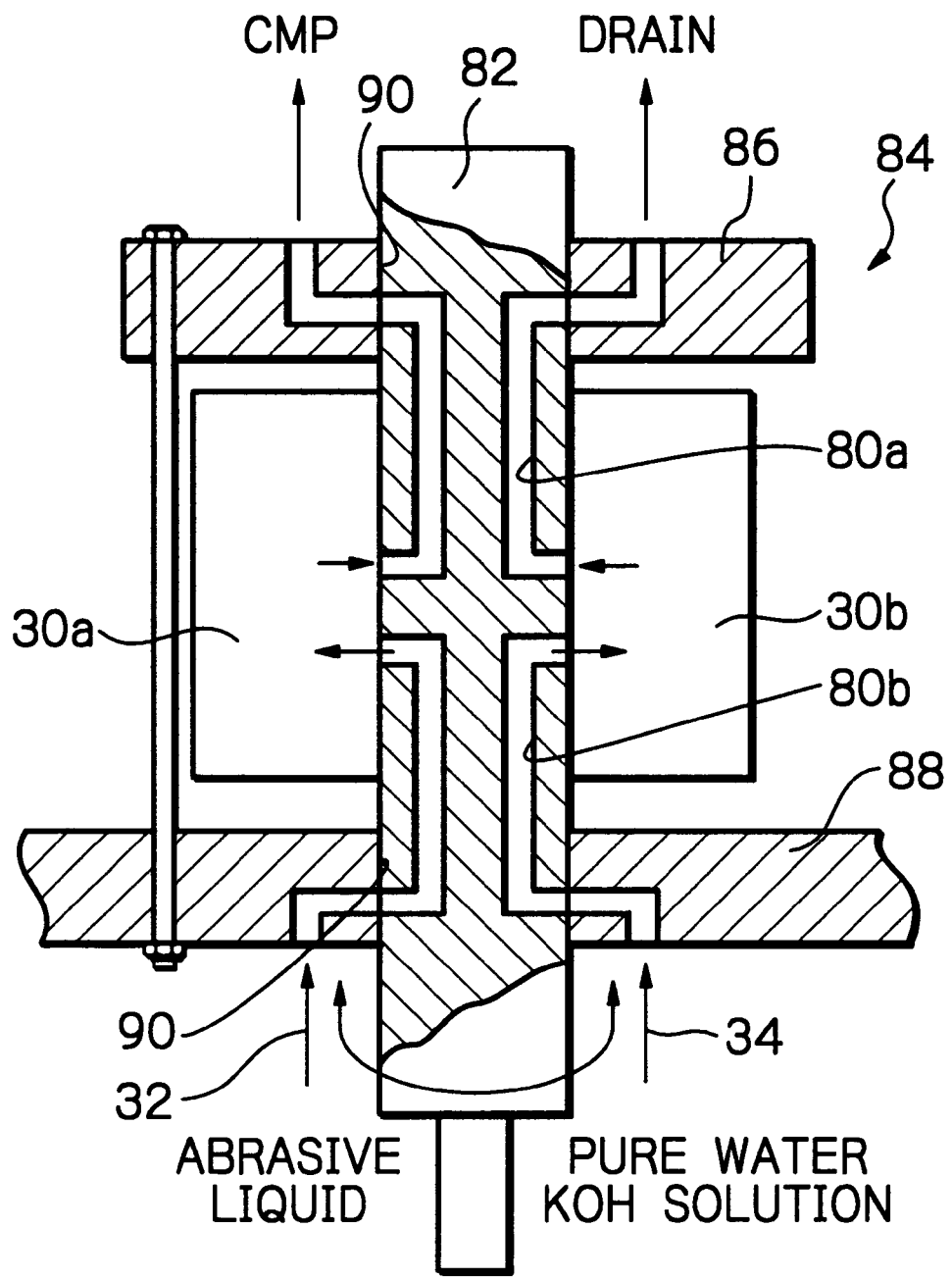
FIG. 14 is a diagram showing a filter apparatus according to a further embodiment of the present invention.
Figure 15:
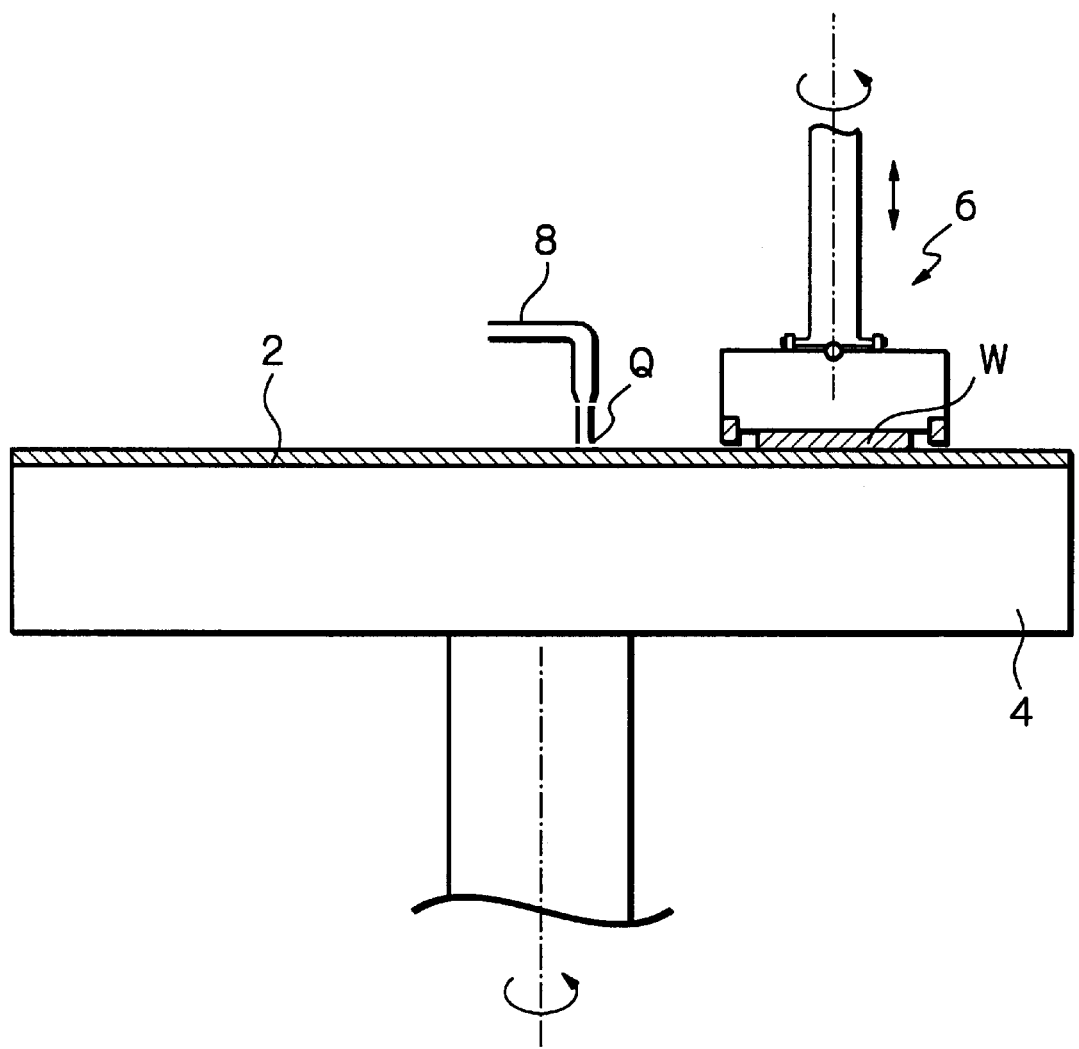
FIG. 15 is a sectional view showing a conventional polishing apparatus.
Figure 16:
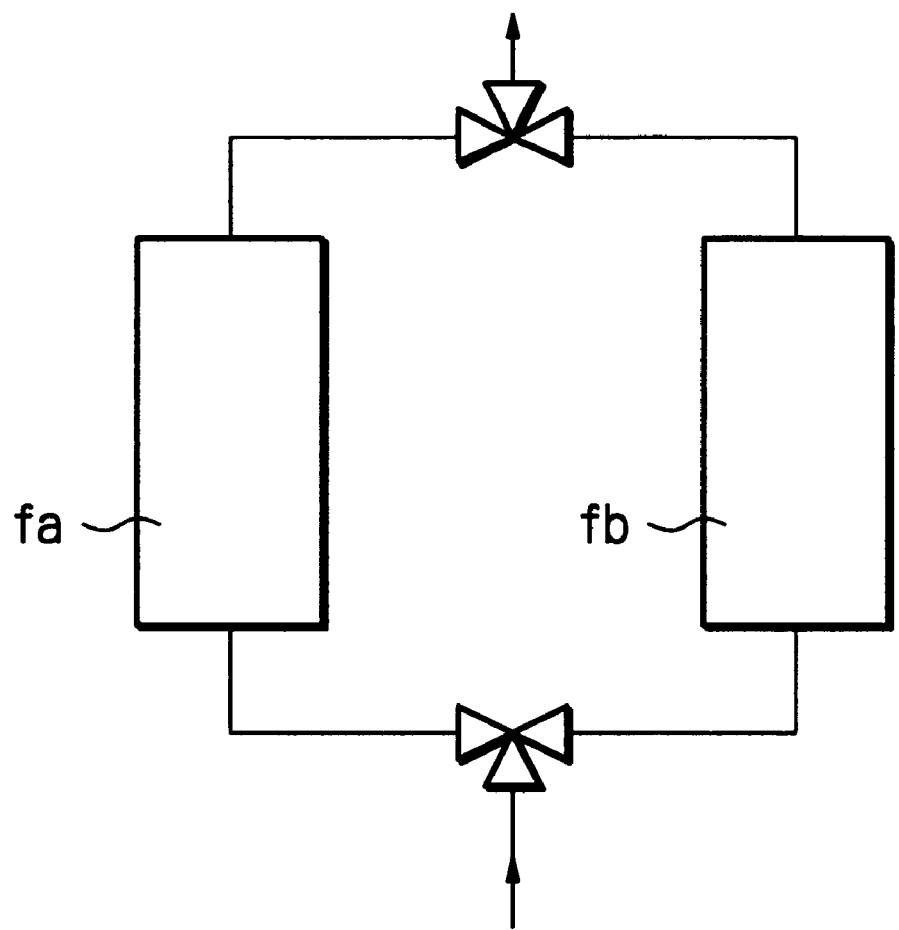
FIG. 16 is a diagram showing a conventional filter apparatus.

FIG. 14 shows a filter apparatus according to still another embodiment of the present invention. The filter apparatus has a switching valve 84 of the type in which a shaft 82 formed with internal flow paths 80a and 80b is rotated. The shaft 82 is rotatably supported at both ends thereof by through-holes 90 formed in a pair of fixed plates 86 and 88. The shaft 82 is provided therein with two sets of two axially extending flow paths 80a and 80b at symmetric positions with respect to the axis. The flow upper and lower paths 80a and 80b each open at one end thereof on the surface of an end portion of the shaft 82 and at the other end thereof on the surface of a central portion of the shaft 82.

Two filter units 30a and 30b are mounted on the outer periphery of a portion of the shaft 82 between the fixed plates 86 and 88. The filter units 30a and 30b are, for example, sectorial cylindrical members having an approximately semicircular sectional configuration. The filter units 30a and 30b have inlet and outlet ports formed in the inner sides thereof. The peripheral walls of the through-holes 90 of the fixed plates 86 and 88 are formed with flow paths selectively brought into communication with the end-side ports of the flow paths 80a and 80b in the shaft 82. The other ends of the flow paths in the fixed plate 86 are connected to the abrasive liquid line 32 and the regenerating line 34, respectively. Seal members, e.g. seal rings, are fitted in necessary portions. In addition, an actuator (not shown) is provided to rotate or reverse the shaft 82 through 180 degrees.

Thus, the switching valve in this embodiment has flow paths opening on the outer peripheral surface of a rotating member (shaft) 82. This embodiment also exhibits the advantageous effects of the present invention as in the case of the foregoing embodiment. It should be noted that the type of the switching valve is not necessarily limited to the above-described rotary type, but a switching valve of the type in which a valving element performs a rectilinear reciprocating motion may be used. In such a case, it is necessary to provide regenerating lines on both sides of an abrasive liquid line.

Figure 17:
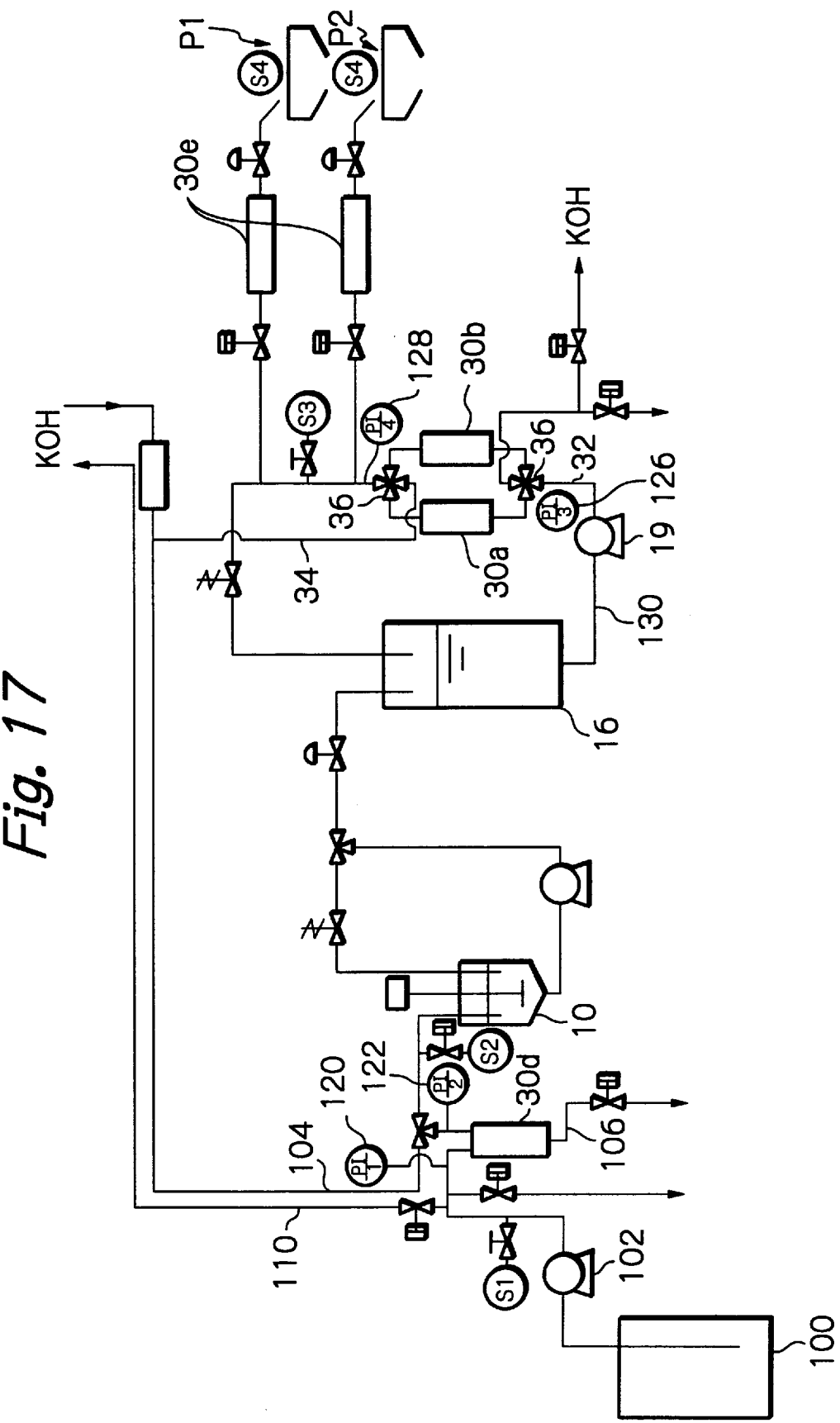
FIG. 17 is a diagram showing a further example of an abrasive liquid supply system in which the filter apparatus according to the present invention may be used.

FIG. 17 shows an abrasive liquid supply system for supplying an abrasive liquid to polishing apparatuses P1 and P2. This system is generally the same as those shown in FIGS. 5–7. The elements of the system which correspond to those of the systems shown in FIGS. 5–7 are designated by the same reference numerals or characters as those in the systems shown in FIGS. 5–7. The system of FIG. 17 additionally includes a raw abrasive pre-processing or filtering system having a first stage raw liquid tank 100 for containing a first stage raw abrasive liquid, a pump 102 for transferring the first stage raw liquid from the tank 100 to the abrasive raw liquid tank 10 through a first stage raw liquid supply line, and a filter unit 30d. The filter unit 30d is provided to filter relatively large particles of abrasive material of sizes more than 5 micron contained in the first stage raw abrasive liquid. The filter unit 30d is formed, for example, by filling a filtration membrane (for example, a pleated type filter "HDC II" produced by Paul Corporation) in a casing made of a resin material. The filter is capable of removing about 95 percent of the particles of the above-stated sizes from the first stage raw liquid. When a predetermined amount of the first stage raw liquid has been supplied from the tank 100 to the tank 10, an aqueous KOH solution at about 50° C. is then supplied to the filter unit 30d through a KOH supply line 104 so that the filter unit is cleaned and regenerated. In order to save the KOH solution, although the KOH solution supplied to the filter unit 30d is discharged, at an initial stage, through a drain line 106, the solution is thereafter returned to a reservoir (not shown) through a return line 110. After completion of the cleaning or regeneration operation, the supply of the first stage raw liquid from the tank 100 to the tank 10 is resumed.

First and second pressure sensors 120 and 122 are provided in the first stage raw liquid supply line at upstream and downstream sides of said filter unit 30d to measure a difference in pressures of the upstream and downstream side of the filter unit. It is determined that a clogging has occurred in the filter unit 30d when the difference in the pressures exceeds 30 kPa. When clogging has occurred while the first stage raw abrasive liquid is being supplied, the supply is halted and the above-stated cleaning or regeneration operation of the filter unit 30d is carried out or the filter unit 30d is replaced with a new one.

As is in the other embodiment described above, the filtered raw abrasive liquid in the tank 10 is further transferred to the mixing tank 16 and is then mixed with a diluent supplied thereto from a diluent tank (not shown) to the tank 10 to prepare an abrasive liquid of a predetermined concentration which is supplied to the polishing apparatuses P1 and P2 through an abrasive liquid supply line 130 which is formed from a portion of a path corresponding to the circulating path 18 of the embodiments stated above and a line corresponding to the draw pipeline 20 of the other embodiments. The abrasive liquid supply line 130 includes a filter apparatus which includes two filter units 30a and 30b and a valve device 36 like the filter apparatus of FIG. 1. The abrasive liquid supply line 32 further includes pressures sensors 126 and 128 at the upstream and downstream sides of the filter apparatus. The filter units 30a and 30b are formed, for example, by filling a filtration membrane (for example, a pleated type filter "CM Pure" produced by US FILTER Corporation) in a casing made of a resin material. The filter has the capability to remove particles of sizes more than 5 micron which may be formed by agglomeration of abrasive grains in the prepared abrasive liquid and which have passed through the filter unit 30d. When a difference between a pressured sensed by the sensor 126 and a pressure sensed by the sensor 128 reaches a predetermined value, it is determined that clogging has occurred in the filter unit 30a or 30b which has been in operation. Then, a control (not shown) operates the valve device so that the clogged filter unit is supplied with a regenerating liquid or KOH solution through a regenerating line 34 while the other filter unit is connected to the abrasive liquid supply line. In order to save the KOH solution, although the KOH solution is drained at the initial stage of the regenerating operation of the clogged filter unit, it is thereafter returned to a KOH source (not shown).

Figure 18:
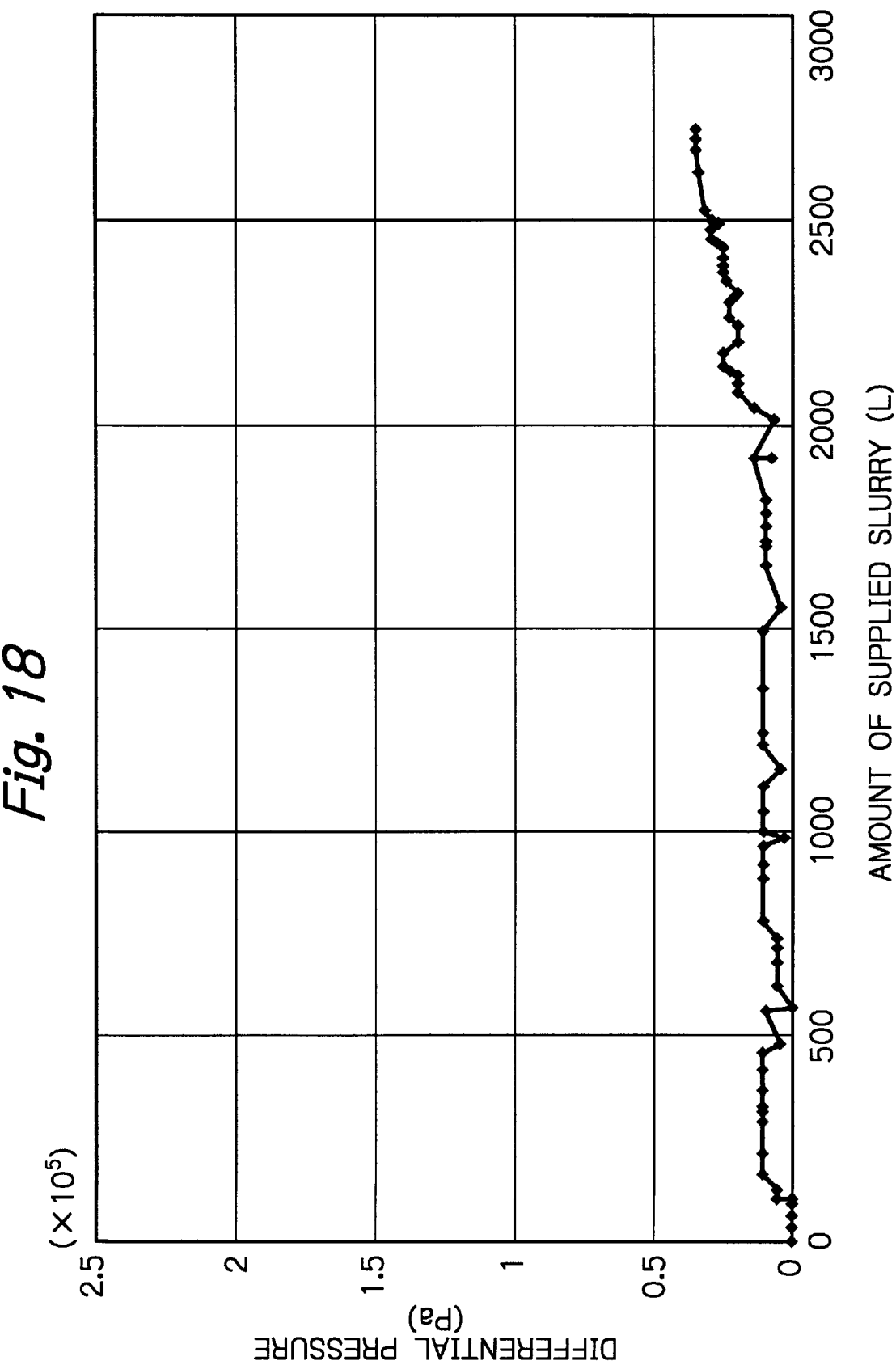
FIG. 18 is a graph showing the result of a test, which shows the differential pressure across a final stage filer unit in the system shown in FIG. 17.

The abrasive liquid supply line 130 is further provided with filter units 30e at a position near to the polishing apparatuses P1 and P2 so as to remove particles formed by agglomeration of abrasive grains in the prepared abrasive liquid in the line downstream of the filter units 30a and 30b and/or particles which have passed through the filter units 30a and 30b. However, in fact, few particles are formed and thus the filter unit 30e can, as shown in FIG. 18, filter a quite large amount of the abrasive liquid without clogging thereof. As such, it is actually unnecessary for the filter unit 30e to be provided with a filter regenerating device unlike the filter units 30a and 30b and it is sufficient for the filter unit 30e to be periodically replaced by a new one.

Figure 19:
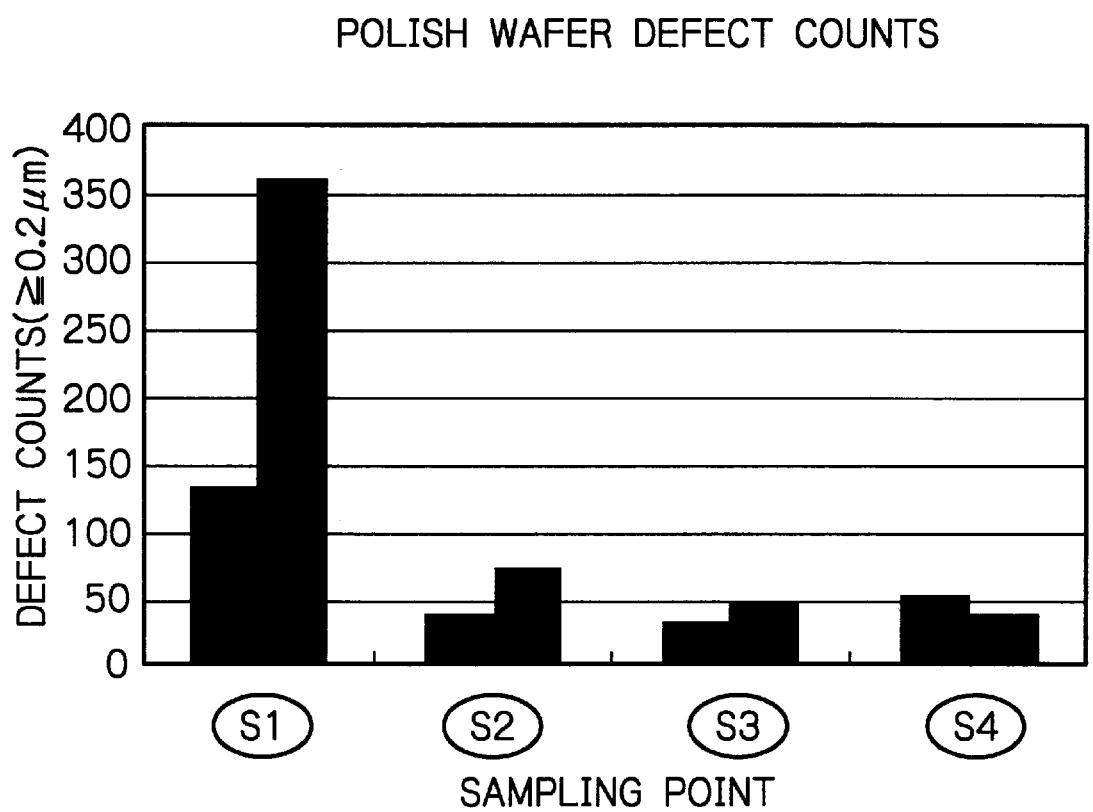
FIG. 19 is a graph showing numbers of defects formed on semiconductor wafers polished with four kinds of abrasive liquids.

In the abrasive supply system shown in FIG. 17, there are provided a plurality of filter units or apparatuses along the supply line, whereby most of harmful particles can be removed from the abrasive liquid supplied to the polishing apparatuses. FIG. 19 shows the number of defects formed on semiconductor substrates which were subjected to polishing operation by the polishing apparatus using the abrasive liquid. This shows that the number of defects generated when abrasive liquids prepared through the supply system shown in FIG. 17 is clearly smaller than that of the defects generated when abrasive liquids are prepared by a supply system without any filter units as used in the supply system of FIG. 17. The number of defects were counted by SFS6420, a measurement device produced by KLA-Tencor Corporation.

As has been described above, the present invention allows a filter replacing operation to be smoothly and reliably performed in an even more purified state by moving a filter unit having trapped particles to the position of a regenerating pipeline and regenerating the filter unit at this position. Furthermore, it is possible to provide a filter apparatus in which a regenerating treatment is carried out as an in-process operation to perform a continuous filtering treatment without replacing a filter unit, thereby reliably trapping solid particles contained in a fluid, e.g. an abrasive liquid, in a pipeline and allowing supply of a fluid of high quality and a stable operation free from clogging. According to another embodiment of the present invention, solidified abrasive grains are redissolved so as to be readily washed away, thereby making it possible to speed the regeneration of the used filter unit. Accordingly, it is possible to promote the achievement of a continuous and automatic polishing process.

It should be noted that the present invention is not necessarily limited to the foregoing embodiments but can be modified in a variety of ways without departing from the gist of the present invention.

What is claimed is:

1. A filter apparatus adapted to be connected to a treatment fluid pipeline for conveying a treatment fluid and a filter regenerating device including a regenerating fluid pipeline for conveying a filter regenerating fluid, said filter apparatus comprising:

at least two filter units; and a valve device operatively connected to said filter units, said treatment fluid pipeline and said filter regenerating device for connecting a selected one of said at least two filter units to said treatment fluid pipeline while connecting the other filter units to said filter regenerating device so that one of said the other filter units is connected to said regenerating fluid pipeline.

2. A filter apparatus according to claim 1, wherein said filter apparatus further includes a casing having first inlet and outlet openings for connection with said treatment fluid pipeline and second inlet and outlet openings for connection with said regenerating fluid pipeline; and said valve device includes a movable member which is movable in said casing and supports said filter units thereon, whereby a selected one of said at least two filter units is connected to said first inlet and outlet openings while one of the other filter units is connected to said second inlet and outlet openings.

3. A filter apparatus according to claim 2, wherein said valve device includes a stationary member fastened to said casing and having a first inlet and outlet paths fluidly connected to said first inlet and outlet openings of said casing, respectively, and second inlet and outlet paths fluidly connected to said second inlet and outlet openings of said casing, and said movable member includes at least two sets of incoming and outgoing paths each set of which is connected to a corresponding one of said filter units, said movable member being rotatably mounted on said stationary member so that said incoming and outgoing paths of a selected one of said at least two sets are connected to said first inlet and outlet paths, respectively, and said incoming and outgoing paths of one of the other sets of said movable member are connected to said second inlet and outlet paths.

4. A filter apparatus according to claim 3, wherein said stationary member has an upper flat surface, said movable member is in the shape of a disc having a lower flat surface which is in a fluid-tight engagement with said upper flat surface of said stationary member, said movable member being rotatable on said upper flat surface of said stationary member.

5. A filter apparatus according to claim 4, wherein said movable member has a circular peripheral edge, and said apparatus further includes an annular guide provided along said circular peripheral edge of said movable member so that the annular guide guides said circular peripheral edge when said movable member is rotated and urges said movable member against said stationary member through said circular peripheral edge.

6. A filter apparatus according to claim 4, wherein said apparatus includes a rotary actuator for rotating said movable member,
said rotary actuator has a drive shaft extending through said casing, said stationary member and said movable member and is drivingly connected to said movable member, said drive shaft having a portion extending beyond said movable member, and
said apparatus further includes a spring provided between said movable member and said portion of said drive shaft extending beyond said movable member to urge said movable member against said stationary member.

7. A filter apparatus according to claim 1, wherein said filter apparatus further comprises a casing having first inlet and outlet openings for connection with said treatment fluid pipeline and second inlet and outlet openings for connection with said regenerating fluid pipeline and a support member for supporting said filter units and fastened to said casing,
said valve device includes a movable member provided in said casing and including at least two sets of incoming and outgoing paths,
said filter apparatus includes at least two pairs of flexible pipes each pair of which is adapted to fluidly connect one of said filter units to a corresponding one of said at least two sets of incoming and outgoing paths of said stationary member, and
said movable member is adapted to be moved to connect incoming and outgoing paths of a selected one of said at least two sets to said first inlet and outlet openings of said casing, respectively, while connecting said incoming and outgoing paths of one of the other sets to said second inlet and outlet openings of said casing, respectively.

8. A filter apparatus according to claim 7, wherein said valve device includes a stationary member stationary mounted on said casing and having first inlet and outlet paths fluidly connected to said first inlet and outlet openings, respectively, and second inlet and outlet paths fluidly connected to said second inlet and outlet openings, respectively, and
said movable member is rotatably mounted on said stationary member so that said incoming and outgoing paths of a selected one of said at least two sets of said movable member are connected to said first inlet and outlet paths of said stationary member, respectively, and said incoming and outgoing paths of one of the other two sets of said movable member are connected to said inlet and outlet paths of said second set of said stationary member, respectively.

9. A filter apparatus according to claim 8, wherein said stationary member has an upper flat surface,
said movable member is in the shape of a disc having a lower flat surface which is in a fluid-tight engagement with said upper flat surface of said stationary member, said movable member being rotatable on said upper flat surface of said stationary member.

10. A filter apparatus according to claim 9, wherein said movable member has a circular peripheral edge, and said apparatus further includes an annular guide provided along said circular peripheral edge of said movable member so that the annular guide guides said circular peripheral edge when said movable member is rotated, said annular guide urging said movable member against said stationary member through said circular peripheral edge.

11. A filter apparatus according to claim 1 wherein said filter regenerating device further includes a second regenerating fluid pipeline for conveying a second regenerating fluid pipeline, and
said valve device is adapted to connect a selected one of said at least two filter units to said treatment fluid pipeline while connecting two of said the other filter units to said regenerating fluid pipeline and said second regenerating fluid pipeline, respectively.

12. A filter apparatus according to claim 11 wherein said filter regenerating device further includes another pipeline conveying a second treatment fluid the components of which are substantially the same as those of said treatment fluid conveyed by said treatment fluid pipeline, and
said valve device is adapted to connect a selected one of said at least two filter units to said treatment fluid pipeline while connecting three of said the other filter units to said regenerating fluid pipeline, said second regenerating fluid pipeline and said another pipeline, respectively.

13. A filter apparatus according to claim 1, wherein said treatment fluid is an abrasive liquid, and said regenerating liquid is a chemical liquid containing a component that redissolves deposited abrasive grains,
said filter apparatus further comprising:
an adjusting mechanism for adjusting at least one of a temperature and concentration of said regenerating liquid to a predetermined level.

14. A filter apparatus according to claim 13, wherein said abrasive grains are silica grains, and said regenerating liquid is a liquid containing KOH.

15. An abrasive liquid supply system for supplying an abrasive liquid to a polishing apparatus, said system comprising:
an abrasive liquid pipeline for supplying an abrasive liquid to said polishing apparatus; and
a filter apparatus incorporated into said abrasive liquid supplying pipeline, said filter apparatus being provided with a filter regenerating device including a regenerating liquid pipeline for conveying a regenerating liquid,
said filter apparatus comprising:
at least two filter units; and
a valve device operatively connected to said filter units, said abrasive liquid pipeline and said filter regenerating device for connecting a selected one of said at least two filter units to said abrasive liquid pipeline while connecting one of the other filter units to said regenerating fluid pipeline.

16. An abrasive liquid supply system according to claim 15, wherein
said filter regenerating device includes:
a first source of a chemical liquid containing a component that redissolves deposited abrasive grains;

a second source of an abrasive liquid the components of which are substantially the same as that of said abrasive liquid conveyed through said abrasive liquid pipeline; and a valve device for successively connecting said first and second sources to said regenerating fluid pipeline.

17. An abrasive liquid supply system according to claim 16, wherein said filter regenerating device further includes:

a third source of a chemical liquid containing a component that redissolves deposited abrasive grains more strongly than that of said first source;

said valve device of said filter regenerating system being adapted to successively connect said first, third and second sources to said regenerating liquid pipeline.

18. An abrasive liquid supply system according to claim 15 wherein said filter regenerating device further includes a second regenerating fluid pipeline for conveying a second regenerating fluid pipeline, and said valve device is adapted to connect a selected one of said at least two filter units to said abrasive liquid pipeline while connecting two of said the other filter units to said regenerating fluid pipeline and said second regenerating fluid, respectively.

19. A filter apparatus according to claim 18 wherein said filter regenerating device further includes another pipeline conveying a second abrasive liquid the components of which are substantially the same as those of said abrasive liquid conveyed by said abrasive liquid pipeline, and said valve device is adapted to connect a selected one of said at least two filter units to said abrasive liquid pipeline while connecting three filter units of said the other filter units to said regenerating fluid pipeline, said second regenerating fluid pipeline and said another pipeline, respectively.

* * * * *